United States Patent [19]
Yoshida et al.

[11] Patent Number: 5,150,449
[45] Date of Patent: Sep. 22, 1992

[54] SPEECH RECOGNITION APPARATUS OF SPEAKER ADAPTATION TYPE

[75] Inventors: Kazunaga Yoshida; Takao Watanabe, both of Tokyo, Japan

[73] Assignee: NEC Corporation, Tokyo, Japan

[21] Appl. No.: 688,715

[22] Filed: Apr. 23, 1991

Related U.S. Application Data

[63] Continuation of Ser. No. 353,838, May 18, 1989, abandoned.

[30] Foreign Application Priority Data

May 18, 1988 [JP] Japan ................. 63-122559

[51] Int. Cl.$^5$ .................................................. G10L 5/00
[52] U.S. Cl. .......................................... 395/2; 381/42
[58] Field of Search ............ 381/42, 43; 395/2; 382/15, 36, 40

[56] References Cited

U.S. PATENT DOCUMENTS

| | | | |
|---|---|---|---|
| 3,191,150 | 6/1965 | Andrews . | |
| 3,287,649 | 11/1966 | Rosenblatt | 381/43 |
| 4,618,984 | 10/1986 | Das et al. | 381/43 |
| 4,720,802 | 1/1988 | Damoulakis et al. | 381/43 |
| 4,805,225 | 2/1989 | Clark | 382/15 |
| 4,829,577 | 5/1989 | Kuroda et al. | 381/43 |
| 4,876,731 | 10/1989 | Loris et al. | 381/15 |

OTHER PUBLICATIONS

IBM Technical Disclosure Bulletin, vol. 21, No. 8, Jan. 1979, pp. 3413-3414, New York, U.S.: C. C. Tappert et al.; "Fast training method for speech recognition systems".

ICASSP-82, Proceedings-IEEE International Conference on Acoustics, Speech and Signal Processing, Paris, 3rd-5th May 1982, vol. 3, pp. 1657-1660, IEEE, New York, U.S.; J. Jaschul: "Speaker adaptation by a linear transformation with optimised parameters".

*Primary Examiner*—Emanuel S. Kemeny
*Attorney, Agent, or Firm*—Sughrue, Mion, Zinn, Macpeak & Seas

[57] ABSTRACT

A speech recognition apparatus of the speaker adaptation type operates to recognize an inputted speech pattern produced by a particular speaker by using a reference pattern produced by a voice of a standard speaker. The speech recognition apparatus is adapted to the speech of the particular speaker by converting the reference pattern into a normalized pattern by a neural network unit, internal parameters of which are modified through a learning operation using a normalized feature vector of the training pattern produced by the voice of the particular speaker and normalized on the basis of the reference pattern, so that the neural netowrk unit provides an optimum output similar to the corresponding normalized feature vector of the training pattern. In the alternative, the speech recognition apparatus operates to recognize an inputted speech pattern by converting the inputted speech pattern into a normalized speech pattern by the neural network unit, internal parameters of which are modified through a learning operation using a feature vector of the reference pattern normalized on the basis of the training pattern, so that the neural network unit provides an optimum output similar to the corresponding normalized feature vector of the reference pattern and recognizing the normalized speech pattern according to the reference pattern.

8 Claims, 3 Drawing Sheets

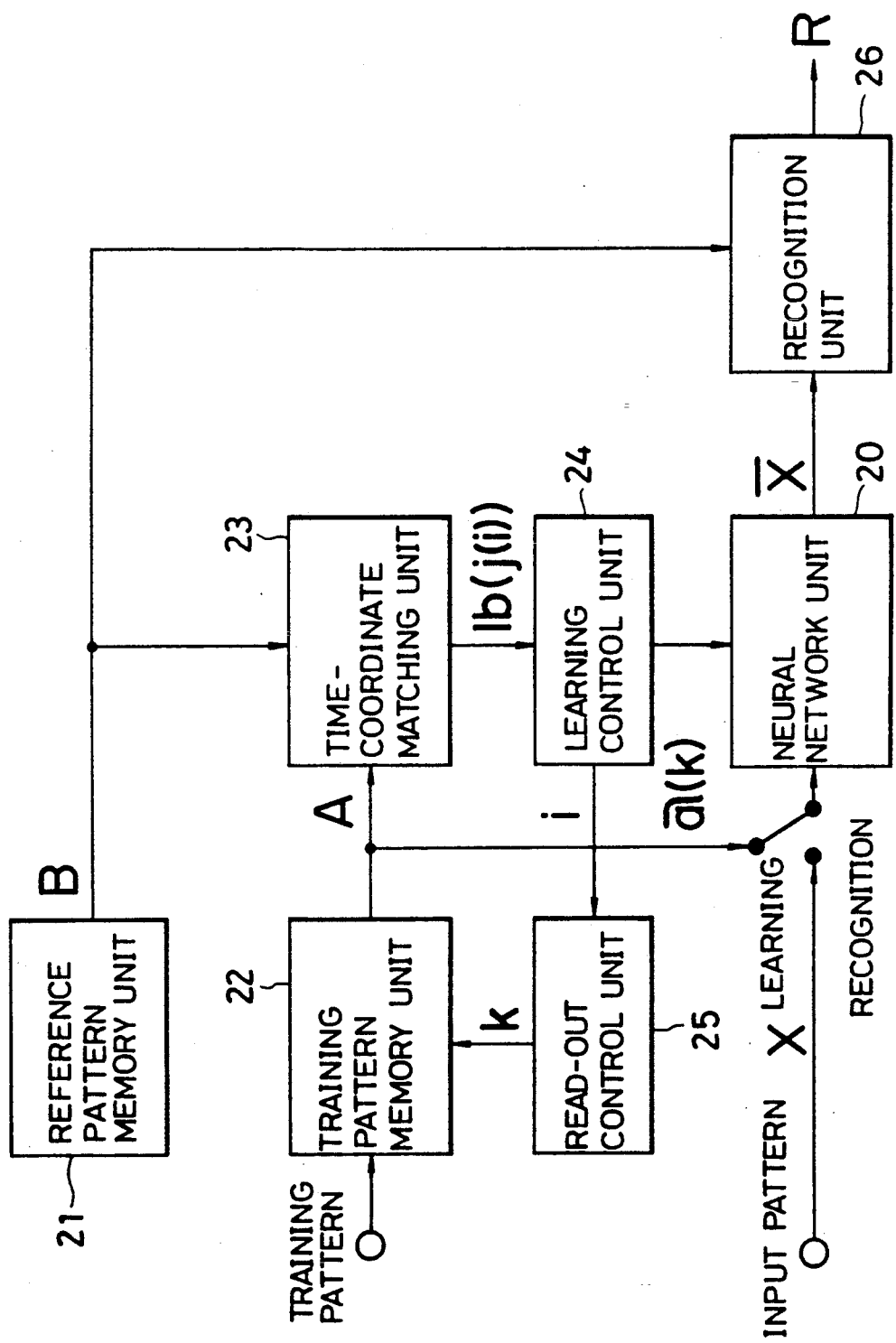

SPEECH RECOGNITION APPARATUS OF SPEAKER ADAPTATION TYPE

This is a continuation of application Ser. No. 07/353,838 filed May 18, 1989, now abandoned.

BACKGROUND OF THE INVENTION

The present invention relates to speech recognition apparatus of the speaker adaptation type in which the speech recognition apparatus can be adaptable to speeches of different speakers and in different circumstances.

There have been conventional methods of recognizing input speech using a prestored reference pattern which is a speech pattern of the standard voice. Such methods include DP (dynamic programming) matching method, and Hidden Markov Model (HMM) method described in the publicated paper, Proceeding of The IEEE. Vol. 73, No. 11, page 1625 "Structural Methods in Automatic Speech Recognition" November, 1985 (hereinafter, referred to as "reference 1").

In the speech recognition apparatus utilizing these methods, in the case of recognizing speech of a particular person different from the speaker of the reference pattern (hereinafter, referred to as "particular speaker"), the reference pattern has to be adapted to voice of the particular speaker so that the high recognition performance is obtained, because the speech pattern varies with the particular speaker. Further, in the case of recognizing speech uttered in circumferences where magnitudes of background noise differ or circumstances where a voice is transmitted through telephone line or not, the speech pattern is considerably deformed in such extent that modification of the reference pattern is necessitated. Hereinafter, the invention will be described mainly in connection with the case of recognizing the speech of particular speaker, but the invention can be applied to the recognition of speech uttered in different circumstances.

Conventionally, in the case of adapting the speech recognition apparatus to the particular speaker, the particular speaker is required to previously utter all of the words to be recognized, and replace the reference pattern with the speech pattern of the particular speaker. However, when the vocabulary of words to be recognized is rather large, laborious work is required for the particular speaker to utter all of the words to be recognized.

In order to eliminate such laborious work, there has been already proposed a method of adapting the reference pattern to the particular speaker according to a small amount of training speech pattern previously uttered by the particular speaker. For example, the speaker adaptation based on vector quantization is described in the publicated paper IEEE, ICASSP 86 49.5, page 2643, "Speaker Adaptation Through Vector Quantization" 1986 (hereinafter, referred to as "reference 2").

According to this method, firstly, a codebook for the vector quantization is generated from speech pattern of a reference speaker having standard voice (hereinafter, this codebook is called "the reference codebook"), and then the speech pattern is vector-quantized by using the reference codebook to generate the reference pattern. When speech of a particular speaker is recognized, the reference codebook is normalized to generate a normalized codebook by using a speech pattern of sample words selected from the vocabulary to be recognized, which has been previously uttered by the particular speaker (hereinafter, this speech pattern is called "training pattern"). The speech of a particular speaker can be recognized by using this normalized codebook in place of the reference codebook without modifying the vector-quantized reference pattern. Namely, even if the vocabulary to be recognized is large, the speech recognition apparatus can be adapted to utterance of the particular speaker by having the particular speaker previously utter part of the vocabulary without uttering all of the words belonging to the vocabulary.

Next, the method of making the normalized codebook will be described hereinbelow. Firstly, a training codebook is generated according to the training pattern, and then the training pattern is vector-quantized by using the training codebook. Subsequently, the time-coordinate or the time-axis of the reference pattern and the training pattern of the same word are matched by using the DP matching. The frequency of code vectors in the training codebook (hereinafter, these code vectors are called "training code vectors") is made to correspond to a given code vector in the reference codebook (hereinafter, this code vector is called "reference code vector") is stored in the form of a histogram. The normalized codebook is obtained by weighting the training code vectors made to correspond to each reference code vector according to their frequencies in the histogram and by averaging the weighted training code vectors.

However, in the conventional method as described in the reference 2, since the vector quantization is utilized, the reduction of recognition rate is not avoided due to quantization error.

In addition, the variation of speech pattern according to difference speakers and circumstances depends on influences due to preceding and succeeding phoneme, that is phonetic environment. Therefore, in the conventional conversion method based on one-by-one processing of an individual vector at a given point of time since the influences from the phonetic environment cannot be taken into account, the proper conversion cannot be carried out.

SUMMARY OF THE INVENTION

An object of the present invention is to, therefore, realize a speaker adaptation method of high performance in which the quantization error is eliminated and the influences of the phonetic environment is taken into account.

According to the present invention, a speech recognition apparatus comprising: training pattern supplying means for supplying at least one sample speech pattern produced by a particular speaker as a training pattern said training pattern being composed of a time series of first feature vectors;

reference pattern storing means for storing a plurality of standard reference patterns including at least one sample reference pattern corresponding to said sample speech pattern, said standard reference patterns being composed of a time series of second feature vectors and produced by a standard speaker different from said particular speaker;

a neural network including a plurality of input nodes in its input layer and a plurality of output nodes in its output layer, each of said input nodes being connected to said output nodes and being weighted by corresponding internal parameters;

learning control means supplied with said training pattern for modifying said internal parameters of said neural network in a learning phase, said neural network being supplied with a plurality of said time series of said second feature vectors, with a vicinity of a time point, of said sample reference pattern and converting said time series of said second feature vectors into time series of third feature vectors of a normalized sample reference pattern, said internal parameters being modified so as to minimize a difference between each of said first feature vectors, corresponding to said time point, of said training pattern and each of said third feature vectors of said normalized sample reference pattern;

said neural network receiving, in a recognition phase after said learning phase, a plurality of said standard reference pattern and converting said standard reference patterns into normalized standard reference patterns; and a recognition unit for receiving an input speech pattern produced by said particular speaker and said normalized standard reference patterns and for recognizing said input speech pattern based on said normalized standard reference patterns.

According to a second species of the present invention a speech recognition apparatus comprising:

training patterns supplying means for supplying at least one sample speech pattern produced by a particular speaker as a training pattern, said training pattern being composed of a time series of first feature vectors;

reference pattern storing means for storing a plurality of standard reference patterns including at least one sample reference pattern corresponding to said sample speech pattern, said standard reference patterns being composed of a time series of second feature vectors and produced by a standard speaker different from said particular speaker;

a neural network including a plurality of input nodes in its input layer and a plurality of output nodes in its output layer, each of said input nodes being connected to said output nodes and being weighted by corresponding internal parameters;

learning control means supplied with said standard reference pattern for modifying said internal parameters of said neural network in a learning phase, said neural network being supplied with a plurality of said time series of said first feature vectors, within a vicinity of a time point, of said training pattern and converting said time series of said first feature vectors into time series of third feature vectors of a normalized input speech pattern, said internal parameters being modified so as to minimize a difference between each of said second feature victors, corresponding to said time point, of said standard reference pattern and each of said third feature vectors of said normalized input speech pattern;

said neural network receiving, in a recognition phase after said learning phase, an input speech pattern produced by said particular speaker and converting said input speech pattern into a normalized input speech pattern after said internal parameters are modified;

a recognition unit for receiving said normalized input speech pattern and said standard reference patterns and for recognizing said normalized input speech pattern based on said standard reference pattern.

The speech recognition apparatus of speaker adaptation type according to the first species of invention operates to convert the standard reference pattern generated according to the voice of standard speaker into the normalized pattern of particular speaker by means of the neural network unit, and to recognize the speech of particular speaker according to the normalized pattern. The speech recognition apparatus of speaker adaptation type according to the second species of the invention operates to convert speech inputted by a particular speaker into speech pattern of the standard speaker by means of the neural network unit, and to recognize the converted speech pattern according to the standard reference pattern of the standard speaker.

The used neural network unit can be comprised of a neuron-like network of the pattern association type described, for example, in the report from Computer Science Department Carnegie-Mellon University, "Experiments on Learning by Back Propagation" by David C. Plant etc., Jun. 1986 (hereinafter, referred to as "reference 3").

FIG. 1 of the drawing of the present application shows a structure of the neural network. As shown in the figure, the neural network has multi-layer structure of an input layer, an intermediate layer and an output layer. The intermediate layer is composed of a single layer as shown in the figure, but may be composed of two or more layers. The intermediate layer may be eliminated.

Each layer is composed of nodes, and in the neural network, an output of the individual node is obtained by converting, through a non-linear function, the total value of outputs from preceding nodes multiplied by weight W. As described above, the conversion characteristic of neural network is determined by the weight W. The value of weight W can be determined by learning.

The speech pattern is obtained by analyzing inputted speech. Various known analyzing methods may be utilized such as Cepstram analysis. Such speech pattern is comprised of a time series of feature vectors as follows:

$$A = a\ (1), a\ (2), \ldots a\ (i), \ldots a\ (I), a\ (i) = a(i,p),\ 1 \leq p \leq P \tag{1}$$

where I indicates a number of frames of the speech pattern, a P indicates a number of dimension of the feature vector.

According to the present invention, a feature ventor a (i) represented in the formula (1) is converted into normalized or adapted feature vector a (i) by using the neural network. Namely, when a value of each element a (i,p) of the feature vector a (i) is inputted into each node (total number of the nodes is P) of the input layer, each node of the intermediate and output layers calculates its output and each node (total number of the nodes is P) of the output layer outputs a value of each element ā (i,p) of the adapted feature vector a (i).

A single feature vector a (i) is applied to the input layer in the above described embodiment; however, a plurality of feature vectors a (k) ($i-e_1 \leq k \leq i+e_2$, $e_1$, $e_2$ is a given integer) arranged in the vicinity of the time point i can be provided concurrently to the input layer. By such operation, it can be possible to carry out the conversion in which influence of adjacent phonetic environment is taken into account by providing the feature vectors including those belonging to several preceding and succeeding frames to the input layer of the neural network unit during the conversion of particular feature vector.

Next, a learning method of internal parameter (weight W) of the neural network will be explained hereinbelow. It is assumed that the speech pattern A is to be adapted to another speech pattern B as represented by:

$$B = |b(1), |b(2), \ldots |b(j), \ldots |b(J) \quad (2)$$

This speech pattern B represents, for example, the same word uttered by a particular speaker different from the speaker of the speech pattern A.

The first step is to find correspondence between the time-coordinate of speech pattern A and the time-coordinate of speech pattern B. Namely, a table j(i) which designates frame j of the speech pattern B corresponding to frame i of the speech pattern A is determined by DP matching in similar manner as described in the reference 1. Further, this matching of time-coordinate can be carried out by small amount of calculation according to the linear expansion and compression process. Namely, the correspondence of time-coordinate can be found according to the following relation:

$$j = j(i) = (i \times J)/I \quad (3)$$

Based on the result of matching or correspondence, the neural network is provided at its input nodes with the speech pattern vector a (i), and the internal parameter of the neural network is modified so that the neural network unit provides an optimum output similar to corresponding speech pattern vector |b (j(i)) which is a desired output (teaching signal) at that time. This modification or learning is carried out by using a back propagation method detailedly described in the reference 3. At this time, a reasonable amount of training speech patterns are repeatedly provided so as to carry out the learning.

BRIEF DESCRIPTION OF THE DRAWINGS

FIG. 3 is a circuit block diagram showing a second embodiment of the speech recognition apparatus according to the present invention.

DETAILED DESCRIPTION OF THE INVENTION

Figure 1:
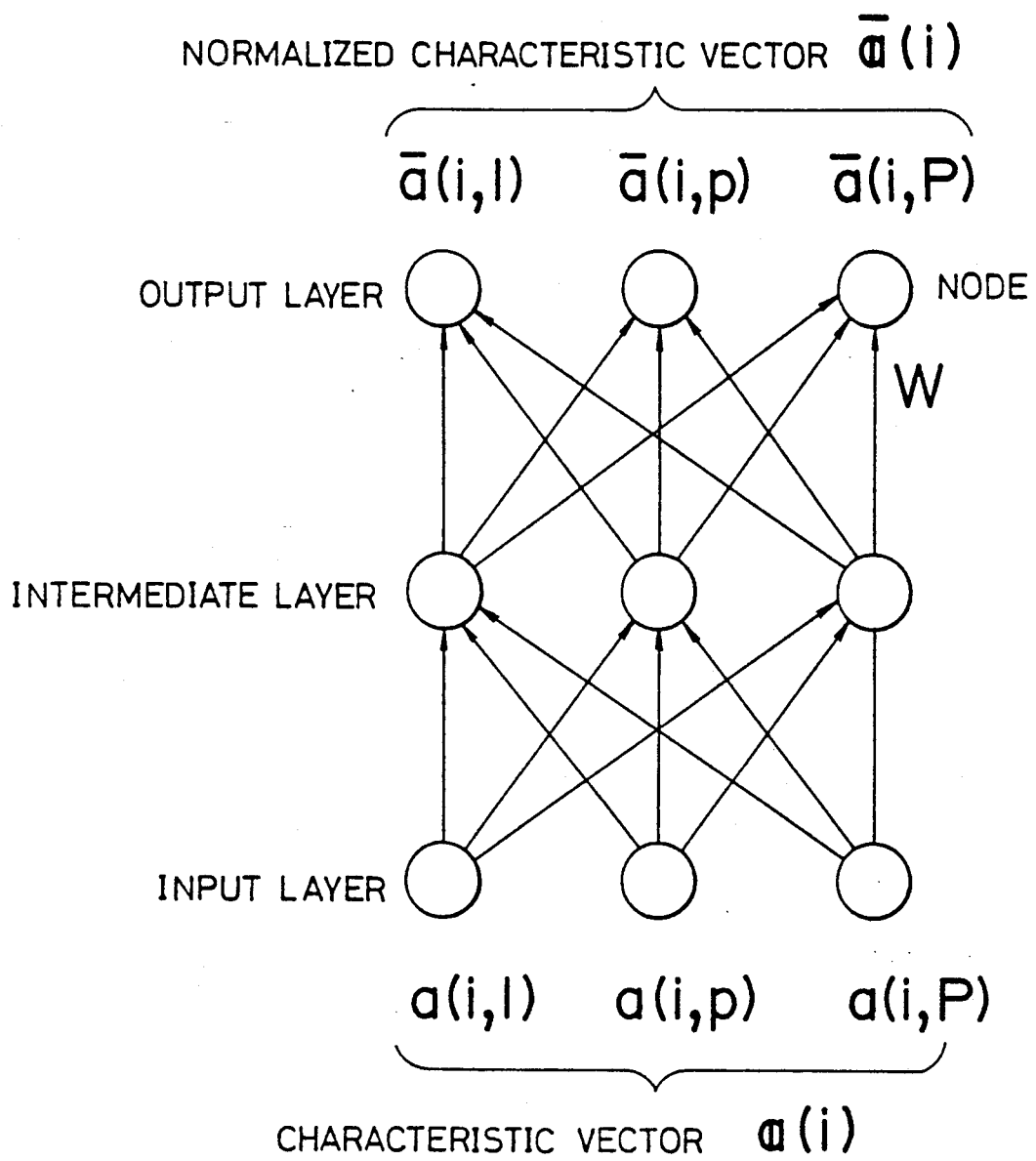
FIG. 1 is a schematic diagram showing structure of neural network.
Figure 2:
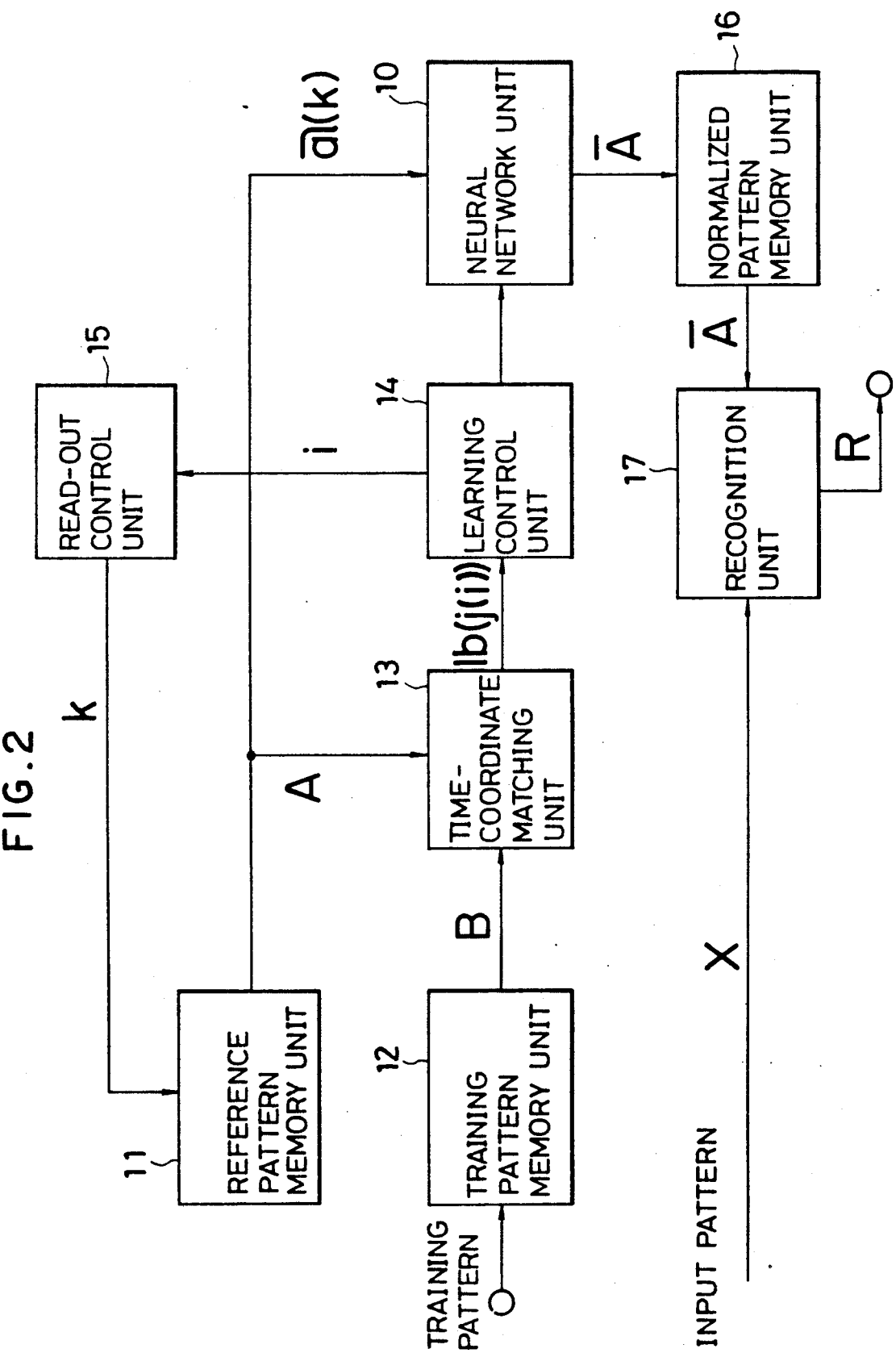
FIG. 2 is a circuit block diagram showing a first embodiment of the speech recognition apparatus according to the present invention.

A first embodiment of the present invention is explained hereinbelow in conjunction with the drawings. FIG. 2 is a structural diagram showing the first embodiment of the invention.

Firstly, a learning phase is explained, in which internal parameters of a neural network unit 10 are modified. standard reference patterns which are produced by a voice of the standard speaker is prestored in a reference pattern memory unit 11. The standard reference patterns include some sample reference patterns. In this learning phase, the sample reference patterns are used for learning the neural network unit 10, and thus the sample reference patterns are sometimes called merely "reference patterns" in the following description. At first, a sample speech pattern of a particular speaker or user (training pattern) is stored into a training pattern memory unit 12. Word category of this training pattern is a part of (or whole of) the category of the reference pattern.

A time-coordinate matching unit or a time-axis matching unit 13 operates to find the correspondence of the time-coordinate of reference pattern A read out from the reference pattern memory unit 11 to training pattern B read out from the training pattern memory unit 12 by the DP matching method, so as to determine the correspondence of the feature vector |b (j(i)) of the training pattern B to the feature vector a (i) of the reference pattern A. A learning control unit 14 operates when receiving the feature vector |b (j(i)) to output frame number data i to a read-out control unit 15. Then the read-out control unit 15 produces a control signal indicative of the integer number k ($i - e \leq k \leq i + e$) effective to read out vectors a (k) of the reference pattern A in the vicinity of frame i from the reference pattern memory unit 11. When the reference pattern vectors a (k) ($i - e \leq k \leq i + e$) are inputted into the neural network unit 10, the learning control unit 14 controls the neural network unit 10 to update its internal parameter so that the difference between normalized feature vector a (i) and feature vector b (j) (i)) is minimized, to thereby carry out the learning. This learning algorithm uses the back propagation described detailedly in the reference 3.

The above described learning operation is carried out repeatedly for all of the training patterns B. After finishing the learning operation of neural network unit 10, all of the standard reference patterns A stored in the reference pattern memory unit 11 are converted by the neural network unit 11 into adapted or normalized patterns $\overline{A}$ which are stored in a normalized pattern memory unit 16, to thereby complete the learning phase.

In the recognition phase, inputted speech pattern X of the particular speaker is recognized by a recognition unit 17 based on the normalized pattern $\overline{A}$ stored in the normalized pattern memory unit 16 so that the result R is outputted from the recognition unit 17. The recognition method may utilize, for example, the DP matching described in the reference 1. Since the normalized pattern $\overline{A}$ is already adapted to the particular speaker, no specific process is needed during the recognition of speech of the particular speaker.

It is possible to convert the standard reference pattern in real time basis by the neural network unit 10 when reading out the same during the recognition operation without the normalized pattern memory unit 16.

Next, a second embodiment of the invention is explained in conjunction with the drawings. FIG. 3 is a structural diagram showing the second embodiment. Firstly, the learning phase is explained, in which a neural network unit 20 learns its internal parameter. A reference pattern memory unit 21 is prestored with the standard reference patterns produced according to the speech of the standard speaker. At first, a training pattern memory unit 22 stores the sample speech pattern of the particular speaker or user (training pattern). Word category of this training pattern is a part of (or whole of) a word category of the reference pattern.

A time-coordinate matching unit 23 operates to find the correspondence of the time-coordinate between reference pattern B read out from the reference pattern memory unit 21 and training pattern A read out from the training pattern memory unit 22, for the same word by using the DP matching so as to determine the correspondence of feature vector |b (j(i)) of the reference pattern B to characteristic vector a (i) of the training pattern A. The read-out control unit 25 outputs a control signal which is data k ($i - e \leq k \leq i + e$) to the training pattern memory unit 22, and the training pattern memory unit 22 outputs vectors a (k) of the training pattern A in vicinity of the frame number i. When this training pattern vectors a (k) (i−e≦k≦i+e) are inputted into the neural network unit 20, a learning control unit 24 controls the neural network unit 20 to carry out the learning to updata the internal parameter so that the difference between the normalized feature vector a (i) is minimized and the vector |b (j(i)) as teaching signal data. This learning algorithm utilizes the back propagation described detailedly in the reference 3.

The above described learning operation is carried out repeatedly for all of the training patterns A. When the learning of neural network unit 20 is completed, the learning phase is finished.

In the recognition phase, inputted speech pattern x of the particular speaker is fed to the neural network unit 20 and converted into a normalized speech pattern $\overline{X}$. The normalized speech pattern $\overline{X}$ is recognized by a recognition unit 26 using the standard reference pattern B stored in the reference pattern memory unit 21, and the result R is outputted from the recognition unit 26. The recognition method may utilize, for example, the DP matching described in the reference 1.

According to the second embodiment of the present invention, the inputted speech pattern must be converted through the neural network unit during the recognition operation; however, it is not necessary to reconvert the standard reference pattern even when the standard reference patterns have been modified due to, for example, a change of the vocabulary to be recognized. Accordingly, this embodiment is advantageous when the recognizable vocabulary is frequently changed.

According to the present invention, a high performance speech recognition apparatus having speaker adaptation capabilities can be realized in which the apparatus can be adapted to the utterance of a new speaker and a new circumstance, with a relatively small amount of sample speech for adaptation.

What is claimed is:

1. A speech recognition apparatus comprising:
   training pattern supplying means for supplying at least one sample speech pattern produced by a particular speaker as a training pattern, said training pattern being composed of a time series of first feature vectors;
   reference pattern storing means for storing a plurality of standard reference patterns including at least one sample reference pattern corresponding to said sample speech pattern, said standard reference patterns being composed of a time series of second feature vectors and produced by a standard speaker different from said particular speaker;
   a neural network including a plurality of input nodes in its input layer and a plurality of output nodes in its output layer, each of said input nodes being connected to said output nodes and being weighted by corresponding internal parameters;
   learning control means supplied with said training pattern for modifying said internal parameters of said neural network in a learning phase, said neural network being supplied with a plurality of said time series of said second feature vectors, within a vicinity of a time point, of said sample reference pattern and converting said time series of said second feature vectors into time series of third feature vectors of a normalized sample reference pattern, said internal parameters being modified so as to minimize a difference between each of said first feature vectors, corresponding to said time point, of said training pattern and each of said third feature vectors of said normalized sample reference pattern;
   said neural network receiving, in a recognition phase after said learning phase, a plurality of said standard reference patterns and converting said standard reference patterns into normalized standard reference patterns; and
   a recognition unit for receiving an input speech pattern produced by said particular speaker and said normalized standard reference patterns and for recognizing said input speech pattern based on said normalized standard reference patterns.

2. A speech recognition apparatus as claimed in claim 1, further comprising time coordinate matching means for finding a correspondence between time coordinates of said training pattern and said sample speech pattern so as to output said first feature vectors of said training pattern to said learning control means.

3. A speech recognition apparatus as claimed in claim 1, further comprising a normalized pattern memory provided between said neutral network and said recognition unit for storing said normalized standard reference patterns.

4. A speech recognition apparatus as claimed in claim 1, wherein said training pattern supplying means supplies a plurality of said training patterns, and wherein said reference pattern storing means stores a plurality of said sample reference patterns corresponding to said plurality of said sample speech patterns, said internal parameters of said neural network being modified by said plurality of said training patterns and said sample speech patterns.

5. A speech recognition apparatus comprising:
   training pattern supplying means for supplying at least one sample speech pattern produced by a particular speaker as a training pattern, said training pattern being composed of a time series of first feature vectors;
   reference pattern storing means for storing a plurality of standard reference patterns including at least one sample reference pattern corresponding to said sample speech pattern, said standard reference patterns being composed of a time series of second feature vectors and produced by a standard speaker different from said particular speaker;
   a neural network including a plurality of input nodes in its input layer and a plurality of output nodes in its output layer, each of said input nodes being connected to said output nodes and being weighted by corresponding internal parameters;
   learning control means supplied with said standard reference pattern for modifying said internal parameters of said neural network in a learning phase, said neural network being supplied with a plurality of said time series of said first feature vectors, within a vicinity of a time point, of said training pattern and converting said time series of said first feature vectors into time series of third feature vectors of a normalized input speech pattern, said internal parameters being modified so as to minimize a difference between each of said second feature vectors, corresponding to said time point, of said standard reference pattern and each of said third feature vectors of said normalized input speech pattern;
   said neural network receiving an input speech pattern produced by said particular speaker and converting said input speech pattern into a normalized input speech pattern after said internal parameters are modified;

a recognition unit for receiving said normalized input speech pattern and said standard reference patterns and for recognizing said normalized input speech pattern based on said standard reference patterns.

6. A speech recognition apparatus as claimed in claim 5, further comprising time coordinate matching means for finding a correspondence between time-coordinates of said training pattern and said sample speech pattern so as to output a feature vector of said training pattern to said neural network.

7. A speech recognition apparatus as claimed in claim 5, further comprising a normalized pattern memory provided between said neural network and said recognition unit for storing said normalized input speech pattern.

8. A speech recognition apparatus as claimed in claim 5, wherein said training pattern supplying means applies a plurality of said training patterns, and wherein said reference pattern storing means stores a plurality of said sample reference patterns corresponding to said plurality of said sample speech patterns, said internal parameters of said neural network being modified by said plurality of said training patterns and said sample speech patterns.

* * * * *